(12) United States Patent
Kligler et al.

(10) Patent No.: US 12,100,175 B2
(45) Date of Patent: Sep. 24, 2024

(54) SYSTEM AND METHOD OF DETECTING AT LEAST ONE OBJECT DEPICTED IN AN IMAGE

(71) Applicant: DECI.AI LTD., Givataim (IL)

(72) Inventors: Yosef Kligler, Tel-Aviv (IL); Ofri Masad, Tzoran-Kadima (IL)

(73) Assignee: DECI.AI LTD., Givataim (IL)

( * ) Notice: Subject to any disclaimer, the term of this patent is extended or adjusted under 35 U.S.C. 154(b) by 408 days.

(21) Appl. No.: 17/694,647

(22) Filed: Mar. 14, 2022

(65) Prior Publication Data
US 2022/0292710 A1     Sep. 15, 2022

Related U.S. Application Data

(60) Provisional application No. 63/161,120, filed on Mar. 15, 2021.

(51) Int. Cl.
*G06N 20/00*     (2019.01)
*G06T 1/20*      (2006.01)
(Continued)

(52) U.S. Cl.
CPC .............. *G06T 7/70* (2017.01); *G06N 20/00* (2019.01); *G06T 1/20* (2013.01); *G06T 7/11* (2017.01);
(Continued)

(58) Field of Classification Search
CPC .......... G06N 3/045; G06N 3/08; G06N 20/00; G06N 3/02; G06N 5/04; G06N 3/0464; G06N 3/0455; G06N 5/046; G06V 10/70; G06V 10/82; G06V 10/26; G06V 10/764; G06V 10/454; G06V 20/80; G06V 20/35; G06V 2201/07; G06V 2201/03;
(Continued)

(56) References Cited

PUBLICATIONS

Yan et al., Smart Longitudinal Velocity Control of Autonomous Vehicles in Interactions With Distracted Human-Driven Vehicles, IEEE Access, Nov. 21, 2019 [retrieved Jun. 14, 2024], vol. 7, pp. 168060-168074. Retrieved: https://ieeexplore.ieee.org/abstract/document/8908660 (Year: 2019).*

(Continued)

*Primary Examiner* — Matthew C Bella
*Assistant Examiner* — Dennis Rosario
(74) *Attorney, Agent, or Firm* — The Roy Gross Law Firm, LLC; Roy Gross

(57) ABSTRACT

A method and system for detecting at least one object depicted in an image may include: receiving an input vector IN, comprising a plurality of location data elements, each representing a location of at least a portion of the at least one depicted object, calculating a 2-dimensional (2D) relation matrix REL_2D, where each entry represents a value of a relation operator, between location data elements i, and j; calculating a 2D mask matrix MASK_2D, where each entry is '1' if the confidence of location data element i is greater than the confidence of location data element j, and '0' otherwise; calculating a penalty vector PEN, based on REL_2D and MASK_2D; elementwise multiplying the confidence levels of vector IN and vector PEN, to produce a selection vector SEL; and selecting at least one location data element based on vector SEL as representing the location of the at least one depicted object.

16 Claims, 4 Drawing Sheets

Top 1000 predictions

Output predictions

(51) Int. Cl.
*G06T 7/11* (2017.01)
*G06T 7/70* (2017.01)
*G06V 10/70* (2022.01)
G06N 3/0464 (2023.01)
G06V 10/26 (2022.01)
G06V 10/764 (2022.01)
G06V 10/82 (2022.01)
G06V 30/19 (2022.01)
G06V 40/16 (2022.01)

(52) U.S. Cl.
CPC .......... *G06V 10/70* (2022.01); *G06N 3/0464* (2023.01); *G06T 2207/20084* (2013.01); *G06V 10/26* (2022.01); *G06V 10/764* (2022.01); *G06V 10/82* (2022.01); *G06V 30/19173* (2022.01); *G06V 40/161* (2022.01); *G06V 2201/07* (2022.01)

(58) Field of Classification Search
CPC ............... G06V 40/161; G06V 20/58; G06V 30/19173; G06V 40/28; G06V 40/11; G06V 20/49; G06V 20/695; G06V 20/698; G06V 30/194; G06V 20/52; G06V 30/413; G06V 20/588; G06V 30/18057; G06V 10/7753; G06V 20/41; G06V 30/10; G06V 40/23; G06V 10/809; G06V 10/811; G06V 20/44; G06V 2201/08; G06V 30/153; G06T 2207/20084; G06T 2207/20081; G06T 7/11; G06T 7/10; G06T 7/12; G06T 7/13; G06T 7/194; G06T 5/60; G06T 9/002; G06F 18/24; G06F 16/906; G06F 16/7837; G06F 16/784; G06F 18/2431; G06F 40/279; G06F 16/35; G06F 18/254; G06F 2218/12

See application file for complete search history.

(56) References Cited

PUBLICATIONS

Chen et al., Fully automatic knee osteoarthritis severity grading using deep neural networks with a novel ordinal loss, Jul. 2019 [retrieved Jun. 14, 2024], Computerized Medical Imaging and Graphics, vol. 75, pp. 84-92. Retrieved: https://www.sciencedirect.com/science/article/pii/S0895611118304956 (Year: 2019).*

Liu et al., Adaptive low-rank subspace learning with online optimization for robust visual tracking, Apr. 2017 [retrieved Jun. 14, 2024], Neural Networks, vol. 88, pp. 90-104. Retrieved: https://www.sciencedirect.com/science/article/pii/S0893608017300278 (Year: 2017).*

Xinlong Wang, Rufeng Zhang, Tao Kong, Lei Li, and Chunhua Shen. Solov2: Dynamic and fast instance segmentation, 2020. 34th Conference on Neural Information Processing Systems (NeurIPS 2020), Vancouver, Canada.

* cited by examiner

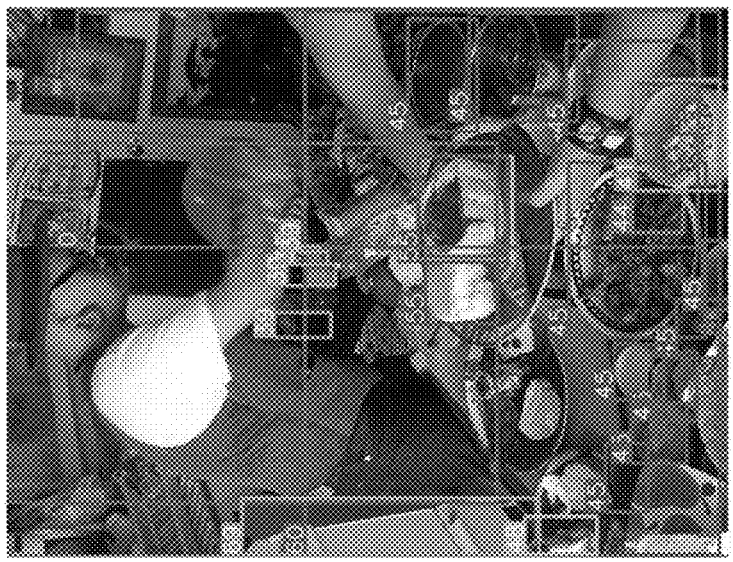
Fig. 1C – Output predictions
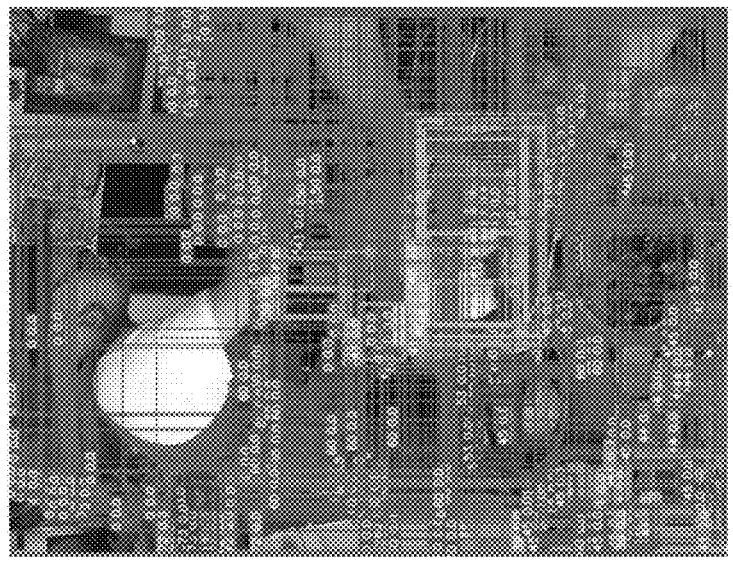
Fig. 1B – Top 1000 predictions
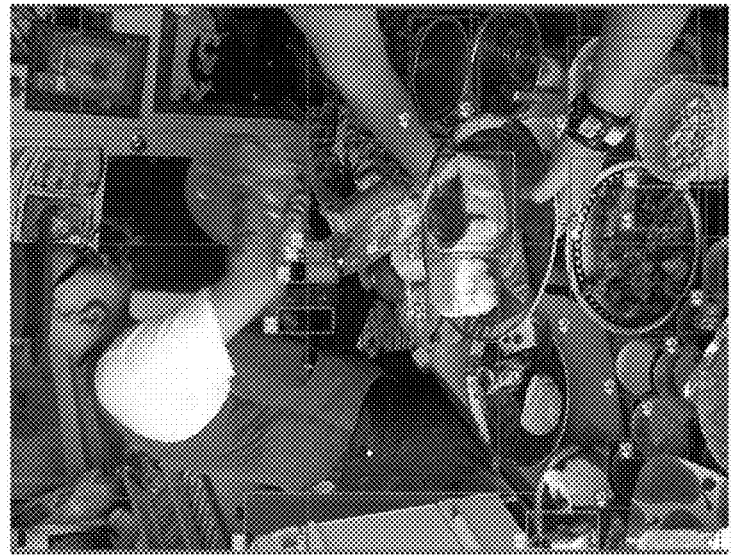
Fig. 1A – Ground truth

SYSTEM AND METHOD OF DETECTING AT LEAST ONE OBJECT DEPICTED IN AN IMAGE

CROSS-REFERENCE TO RELATED APPLICATIONS

This application claims the benefit of priority under 35 U.S.C. § 119(e) of U.S. Provisional Patent Application No. 63/161,120, filed Mar. 15, 2022. The contents of the above application is incorporated by reference as if fully set forth herein in its entirety.

FIELD OF THE INVENTION

The present invention relates generally to the field of computer vision. More specifically, the present invention relates to detection or segmentation of an object in an image.

BACKGROUND OF THE INVENTION

Object detection is a fundamental task in computer vision. The goal of object detection is to detect, locate and/or classify objects depicted in a given image. The output of such algorithm is usually a set of bounding boxes, each defining a location in the image and a class, representing a type of the detected object. Another common task in computer vision is Segmentation. In this task the goal is to classify each pixel in the image to the object it belongs to.

For both detection and segmentation, there exist many algorithms and many deep neural network models which are adapted to predict, as commonly referred to in the art, the required solution. A major downside of currently available algorithms and networks for detection and/or segmentation is that they typically produce a tremendous amount of data elements predicting a location of at least a portion of the depicted objects.

For example, currently available algorithms for object detection produce a large number of bounding boxes, resulting with extreme redundancy in the object detection prediction.

A system and method for efficient analysis and/or selection of location data elements such as segmentations and bounding boxes is therefore required.

SUMMARY OF THE INVENTION

Currently available systems for object detection and/or segmentation may solve this redundancy by running a Non-Max-Suppression (NMS) algorithm, as known in the art, to select only high-confidence predictions, suppress overlapping between bounding boxes, and omit low-confidence predictions. NMS has been an integral part of many computer vision algorithms for over 50 years, and it has several common variants. The original NMS algorithm includes a naïve iterative computation, in which each bounding box is analyzed in view of its peers, and therefore requires extensive computing resources (e.g., computing cycles and memory). One variant of the NMS algorithm is the matrix NMS algorithm, which has been known to accelerate the naïve process by formulating it in a matrix multiplications manner, as explained herein.

Embodiments of the invention may include several improvements to currently available NMS algorithms:

For example, embodiments of the invention may include an adaptation of the matrix NMS algorithm, that may decrease NMS computation latency in relation to each, individual input image, as elaborated herein.

In another example, both the naïve NMS algorithm and the matrix NMS algorithm may execute their computations on each input image individually. Therefore, runtime of computation may scale (e.g., linearly) with the number of images to process. Embodiments of the invention may include an adaptation of the matrix NMS algorithm, that may enable parallel, or concurrent NMS computations, as elaborated herein. Such improvement may, for example, be utilized to increase throughput of processing (e.g., segmentation and/or object detection) of a plurality of images.

Embodiments of the invention may include a method of detecting at least one object depicted in an image by a processing unit. Embodiments of the method may include: receiving, from a detection module, an input vector IN that may include a plurality N of location data elements, representing a location of at least a portion of the at least one depicted object. Each location data element may be associated with a level of confidence. Embodiments of the method may calculate a 2-dimensional (2D) relation matrix REL_2D, where each entry REL_2D (i,j) represents a value of a relation operator, between location data element i, and location data element j. Embodiments of the method may calculate a 2D mask matrix MASK_2D, where each entry MASK_2D(i,j) may be '1' if the confidence of location data element i may be greater than the confidence of location data element j, and '0' otherwise.

Embodiments of the method may: calculate a penalty vector PEN, based on the REL_2D matrix and MASK_2D matrix, where each entry PEN(i) corresponds to a specific location data element i; elementwise multiply the confidence levels of input vector IN and penalty vector PEN, to produce a selection vector SEL. Embodiments of the invention may subsequently detect at least one depicted object by selecting at least one location data element, that corresponds to at least one top valued element of SEL, as representing the location of the at least one depicted object.

According to some embodiments, calculating a penalty vector PEN may include: elementwise multiplying relation matrix REL_2D and mask matrix MASK_2D, to produce a 2D product matrix PROD_2D; calculating a 2D maximum matrix MAX_2D, where each line may include N entries, equal to a maximal value in a corresponding column of product matrix PROD_2D; performing an elementwise operation between product matrix PROD_2D and matrix MAX_2D, to produce a ratio matrix RATIO_2D; and calculating a minimal value of each column of matrix RATIO_2D, to produce vector PEN.

According to some embodiments, the processing unit may include a plurality of processors, adapted to perform parallel processing of data. In such embodiments, the processing unit may receive a plurality of IN vectors, each corresponding to a different image and depicting a respective object; compute, in parallel by the plurality of processors, from the plurality of IN vectors, a corresponding plurality of SEL vectors; and for each SEL vector, selecting at least one location data element that corresponds to at least one corresponding, top valued element of the SEL vector, as representing the location of a corresponding at least one depicted object in the corresponding image.

According to some embodiments, computing the plurality of SEL vectors in parallel may include calculating the PEN vectors, for each vector IN of the plurality of IN vectors, in parallel; and elementwise multiplying in parallel, by the plurality of processors, the confidence values of each IN vector with a corresponding PEN vector, to produce a plurality of product vectors SEL, wherein each vector SEL corresponds to a specific image.

According to some embodiments, computing the plurality of vectors SEL in parallel may include: computing a plurality of REL_2D matrices, each corresponding to a different IN vector, and stacking the plurality of REL_2D matrices in a 3-dimensional (3D) tensor REL_3D; computing a plurality of MASK_2D matrices, each corresponding to a different IN vector, and stacking the plurality of MASK_2D matrices in a 3D tensor MASK_3D; computing a plurality of PEN vectors in parallel, by the plurality of processors, based on the REL_3D tensor and MASK_3D tensor, wherein each PEN vector corresponds to a specific image; and elementwise multiplying the confidence levels of each input vector IN with a corresponding PEN vector, to produce a selection vector SEL, wherein each vector SEL corresponds to a specific image.

According to some embodiments, computing the plurality of PEN vectors in parallel may include: elementwise multiplying, in parallel, the REL_3D tensor and MASK_3D tensor, to produce a product tensor PROD_3D; calculating a plurality of maximum matrices MAX_2D, where each line of each matrix MAX_2D may include N entries equal to the maximal value in a corresponding column of a 2D layer of tensor PROD_3D; performing a parallel elementwise operation between product tensor PROD_3D and the plurality of maximum matrices MAX_2D, to produce a 3D ratio tensor RATIO_3D; and calculating, in parallel, a minimal value of each column of 3D ratio tensor RATIO_2D, to produce the plurality of PEN vectors.

According to some embodiments, the relation operator, between location data element i, and location data element j may be selected from: An Intersection over Union (IoU) operator, a Complete Intersection over Union (CIoU) operator, a Distance Intersection over Union (DIoU) operator and a Generalized Intersection over Union GIoU operator.

According to some embodiments, the elementwise operation between product matrix PROD_2D and matrix MAX_2D may be selected from: an elementwise division operation: (PROD_2D/MAX_2D); a first modified elementwise division operation: ((1−PROD_2D)/(1−MAX_2D)); and a second modified elementwise division operation: $(\exp(-\theta*PROD\_2D^2)/\exp(-\theta*MAX\_2D^2))$, where $\theta$ may be a constant value.

Embodiments of the present invention may include a system for detecting at least one object depicted in an image. Embodiments of the system may include: a non-transitory memory device, wherein modules of instruction code may be stored, and at least one processor associated with the memory device, and configured to execute the modules of instruction code.

Upon execution of said modules of instruction code, the at least one processor may be configured to: receive, from a detection module, an input vector IN, may include a plurality N of location data elements, representing a location of at least a portion of the at least one depicted object, and wherein each location data element may be associated with a level of confidence; calculate a 2D relation matrix REL_2D, where each entry REL_2D (i,j) represents a value of a relation operator, between location data element i, and location data element j; calculate a 2D mask matrix MASK_2D, where each entry MASK_2D(i,j) may be '1' if the confidence of location data element i may be greater than the confidence of location data element j, and '0' otherwise; calculate a penalty vector PEN, based on the REL_2D matrix and MASK_2D matrix, where each entry PEN(i) corresponds to a specific location data element i; elementwise multiply input vector IN and penalty vector PEN, to produce a selection vector SEL. The at least one processor may subsequently detect at least one depicted object by selecting at least one location data element, that corresponds to at least one top valued element of SEL, as representing the location of the at least one depicted object.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 1A, 1B and 1C are images that jointly present an illustrative example of detection of one or more objects depicted in an image, according to some embodiments;

Figure 2:
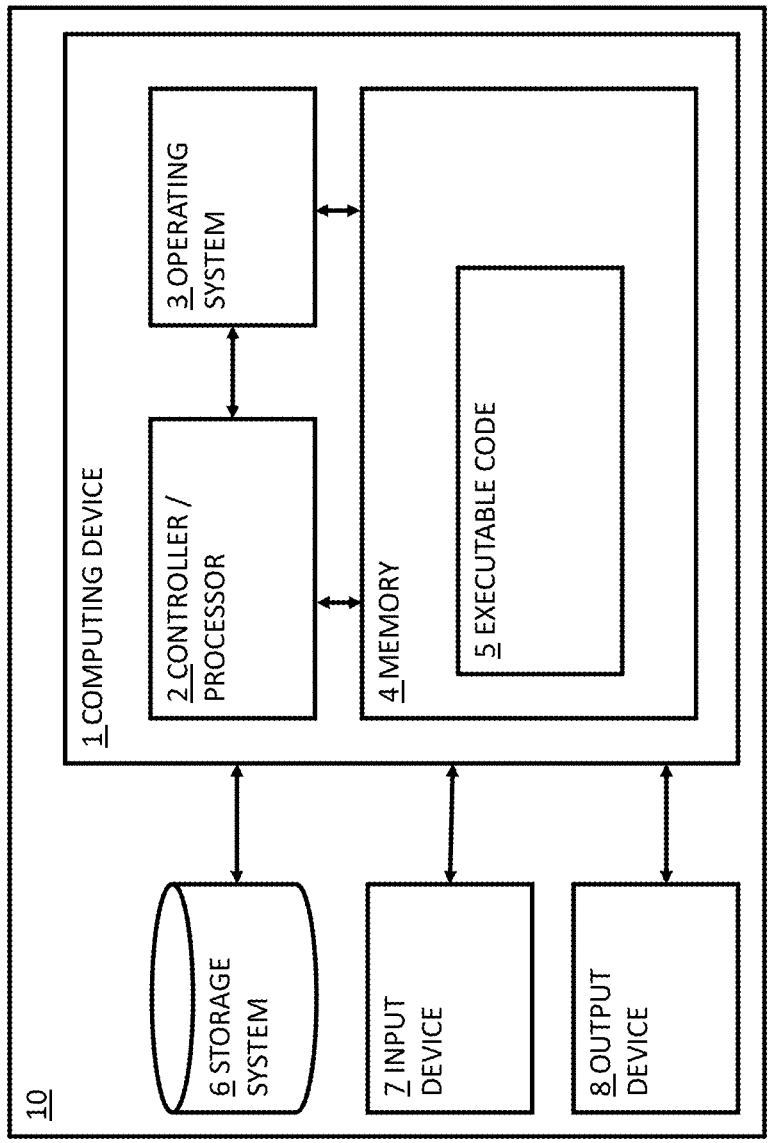
FIG. 2 is a block diagram, showing a computing device which may be included in a system for detecting at least one object depicted in an image, according to some embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items.

Unless explicitly stated, the method embodiments described herein are not constrained to a particular order or sequence. Additionally, some of the described method embodiments or elements thereof can occur or be performed simultaneously, at the same point in time, or concurrently.

Reference is now made to FIGS. 1A, 1B and 1C, which jointly present an illustrative example of detection of one or more objects depicted in an image, according to some embodiments.

As shown in the example of FIG. 1A, an image depicting a scene may be acquired by a camera, and may include a plurality of objects or elements. In this non-limiting example, the depicted objects may include, for example people, tableware, food, etc. FIG. 1A includes "ground truth" labels, presented as enumerated bounding boxes, each representing or defining a location of a corresponding element, depicted in the image. The bounding boxes of FIG. 1A may be referred to as ground truth labels, for example in a sense that a human user may have manually labeled the bounding boxes, or individually confirmed each of the bounding boxes as representing the corresponding locations.

Embodiments of the invention may receive from a detection module such as a machine learning (ML) based object detection model or object segmentation model, a plurality of indications, or "predictions", as commonly referred to in the art, regarding location of at least one depicted object. In the non-limiting example of an object detection algorithm presented in FIG. 1B, the plurality of predictions may include a very large number (e.g., thousands) of bounding boxes, some of which represent at least a portion of an object, associated with a specific, or required class of objects (e.g., tableware), that is depicted in the image. It may be appreciated that FIG. 1B only presents 1000 bounding boxes of approximately 43,000 bounding boxes that were produced by the object detection model in this example.

As shown in the example of FIG. 1C, and as elaborated herein, embodiments of the invention may analyze the incoming plurality of predictions (e.g., in this case—43,000 bounding boxes), and produce therefrom an output set of predictions. The output set of predictions (e.g., as depicted in FIG. 1C) may be much reduced in number, in relation to the predictions included in FIG. 1B. Additionally, the output set of predictions may also represent an improved location of corresponding depicted objects, in relation to the bounding boxes of FIG. 1B. In other words, the bounding boxes of FIG. 1C may better correlate to the ground-truth labels (e.g., as presented in FIG. 1A), than the bounding boxes of FIG. 1B.

Reference is now made to FIG. 2, which is a block diagram depicting a computing device, which may be included within an embodiment of a system for detecting at least one object depicted in an image, according to some embodiments.

Computing device 1 may include a processor or controller 2 that may be, for example, a central processing unit (CPU) processor, a chip or any suitable computing or computational device, an operating system 3, a memory 4, executable code 5, a storage system 6, input devices 7 and output devices 8. Processor 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random-Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short-term memory unit, a long-term memory unit, or other suitable memory units or storage units. Memory 4 may be or may include a plurality of possibly different memory units. Memory 4 may be a computer or processor non-transitory readable medium, or a computer non-transitory storage medium, e.g., a RAM. In one embodiment, a non-transitory storage medium such as memory 4, a hard disk drive, another storage device, etc. may store instructions or code which when executed by a processor may cause the processor to carry out methods as described herein.

Executable code 5 may be any executable code, e.g., an application, a program, a process, task or script. Executable code 5 may be executed by processor or controller 2 possibly under control of operating system 3. For example, executable code 5 may be an application that may detect or segment an object depicted in an image as further described herein. Although, for the sake of clarity, a single item of executable code 5 is shown in FIG. 2, a system according to some embodiments of the invention may include a plurality of executable code segments similar to executable code 5 that may be loaded into memory 4 and cause processor 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Data pertaining to an image may be stored in storage system 6 and may be loaded from storage system 6 into memory 4 where it may be processed by processor or controller 2. In some embodiments, some of the components shown in FIG. 2 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., similar to element 2), a plurality of input units, a plurality of output units, a plurality of memory units, and a plurality of storage units.

A neural network (NN) or artificial neural network (ANN), e.g., a neural network implementing a ML function or Artificial Intelligence (AI) function, may refer to an information processing paradigm that may include nodes, referred to as neurons, organized into layers, with links between the neurons. The links may transfer signals between neurons and may be associated with weights. A NN may be configured or trained for a specific task, e.g., pattern recognition or classification. Training a NN for the specific task may involve adjusting these weights based on examples. Each neuron of an intermediate or last layer may receive an input signal, e.g., a weighted sum of output signals from other neurons, and may process the input signal using a linear or nonlinear function (e.g., an activation function). The results of the input and intermediate layers may be transferred to other neurons and the results of the output layer may be provided as the output of the NN. Typically, the neurons and links within a NN are represented by mathematical constructs, such as activation functions and matrices of data elements and weights. A processor, e.g., CPUs or graphics processing units (GPUs), or a dedicated hardware device may perform the relevant calculations.

Figure 3:
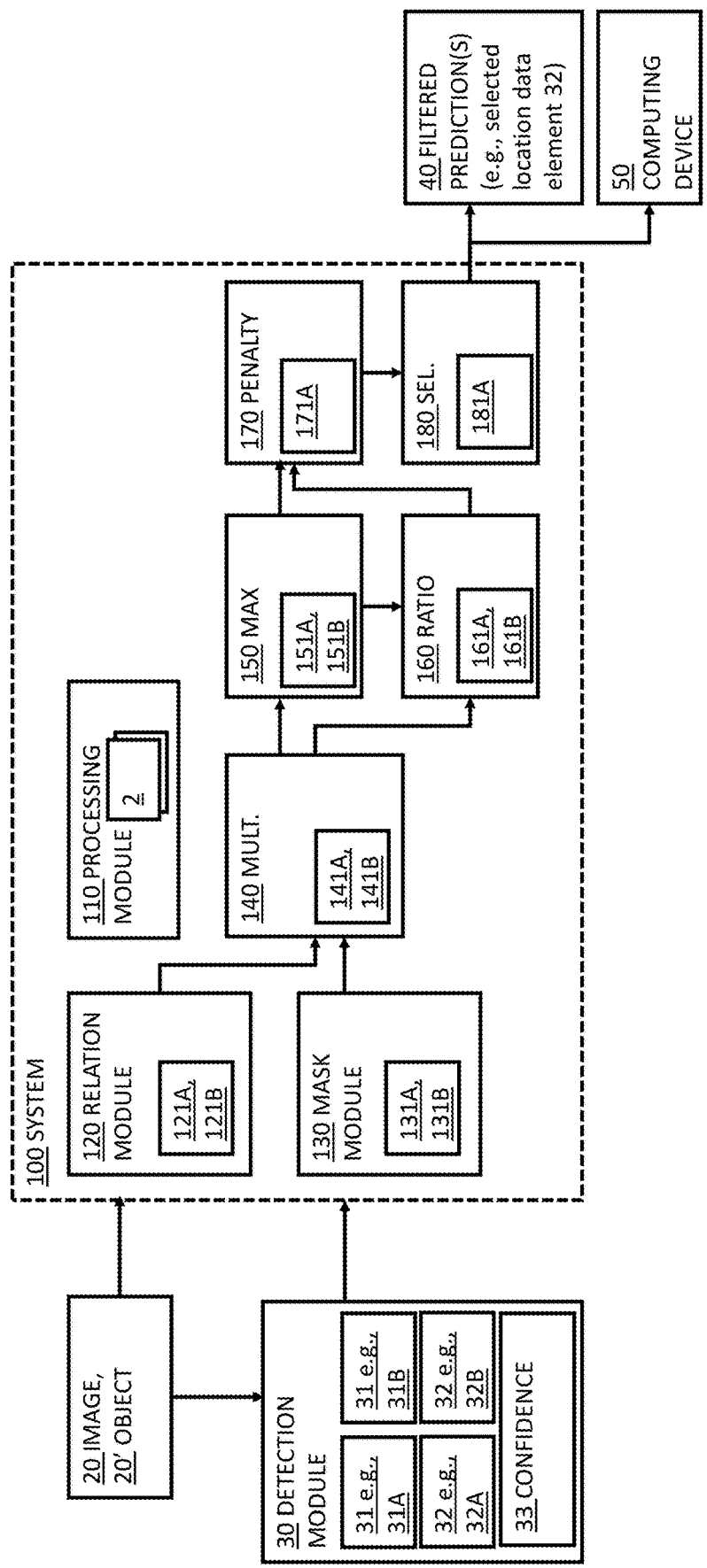
FIG. 3 is a block diagram, showing a system for detecting at least one object depicted in an image, according to some embodiments.

Reference is now made to FIG. 3, which depicts a system 100 for detection and/or segmentation of an object 20' in an image 20, according to some embodiments.

According to some embodiments of the invention, system 100 may be implemented as a software module, a hardware module or any combination thereof.

For example, system 100 may be or may include a computing device such as element 1 of FIG. 2, and may include a processing unit 110, such as processor 2 of FIG. 2. Processing unit 110 may be adapted to execute one or more modules of executable code, including for example, elements 120, 130, 140, 150, 160 and 170 of FIG. 3 (e.g., element 5 of FIG. 2), to perform detection and/or segmentation of an object 20' in an image according to some embodiments of the invention, and as elaborated herein.

According to some embodiments, system 100 may receive from a detection module 30 such as an ML-based object detection model or ML-based image segmentation model, an input vector IN 31. Input vector IN 31 may include a plurality N of location data elements 32, representing a location of at least a portion of an object 20', depicted in an image 20. For example, in embodiments where detection module 30 is an ML-based object detection model as known in the art, input vector IN 31 (e.g., 31A) may include a plurality N of location data elements 32 (e.g., 32A) that are bounding boxes, as depicted in the example of FIG. 1B.

In another example, in embodiments where detection module 30 is an ML-based image segmentation model as known in the art, input vector IN 31 (e.g., 31B) may include a plurality N of location data elements 32 (e.g., 32B) that are segments of image 20, representing a location of at least a portion of an object 20' depicted in image 20.

According to some embodiments, one or more (e.g., each) location data element 32 may be associated with a level of confidence 33, provided by detection module 30 (e.g., ML-based object detection model or ML-based image segmentation model), as known in the art. For example, a location data element 32 may be a bounding box, representing or defining a location of at least a portion of an object 20' depicted in image 20, and a corresponding confidence value 33, or confidence level data element 33 may represent a level of confidence or saliency at which detection module 30 evaluates the bounding box as a representor of the location of the depicted object 20'.

According to some embodiments, system 100 may include a relation module 120, adapted to calculate a 2-dimensional (2D) relation matrix REL_2D, denoted in FIG. 3 as element 121A. Relation matrix REL_2D 121A may be a square matrix where each entry REL_2D(i, j) may represent a value of a relation operator, between location data element i, and location data element j. The relation operator between location data element i, and location data element j may include, for example an Intersection over Union (IoU) operator, a Complete Intersection over Union (CIoU) operator, a Distance Intersection over Union (DIoU) operator and a Generalized Intersection over Union GIoU operator, as known in the art.

For example, for a relation operator that is an IoU operator, and for a given pair (i, j) of location data elements 32 that are bounding boxes, entry (i, j) of relation matrix REL_2D 121A may be, or may include an IoU value computed for the areas of image 20 that are defined by the bounding boxes 32A that correspond to index i and index j of input vector IN 31A.

According to some embodiments, system 100 may include a mask module 130, adapted to compute a 2D mask matrix MASK_2D, denoted in FIG. 3 as element 131A. Mask matrix MASK_2D 131A may be a binary square matrix, where each entry MASK_2D(i, j) may be '1' if the confidence level 33 of location data element i is greater than the confidence level 33 of location data element j, and '0' otherwise.

For example, for a given pair (i, j) of location data elements 32 that are bounding boxes, entry (i, j) of mask matrix MASK_2D 131A may be '1' if a confidence level 33 corresponding to a bounding box of index i in input vector IN 31A is greater than a confidence level 33 corresponding to a bounding box of index j in input vector IN 31A, and '0' otherwise.

According to some embodiments, system 100 may include a multiplication module, adapted to elementwise-multiply or dot-multiply, as commonly referred to in the art, relation matrix REL_2D 121A and mask matrix MASK_2D 131A, to produce a 2D product matrix PROD_2D, denoted in FIG. 3 as element 141A.

In order to provide intuition into the process described herein, it may be noted that product matrix PROD_2D 141A may include, for each location data element i (e.g., each bounding box 32A), a representation of all other location data elements j (e.g., all other bounding boxes 32A), that: (a) have some overlapping with location data element i according to the relation operator (e.g., IoU), and (b) correspond to a higher confidence level 33 than that of location data element i. As known in the art, in order to obtain such representation (e.g., as provided by product matrix PROD_2D 141A), currently available systems and methods for performing Matrix NMS algorithms require an initial phase, in which location data elements 32 of input vector IN 31 are sorted, based on the confidence level data elements 33. As known in the art, such a sorting algorithm may typically require computing resources (e.g., processing cycles, memory, etc.) in the order of at least $O(N \cdot \log(N))$, where N is the length of IN vector 31. It may be appreciated, that by using a relation matrix as elaborated herein, embodiments of the invention may avoid the need to sort input vector IN 31, and thus expedite the analysis of input vector IN, and decrease latency for production of filtered predictions of location data elements.

According to some embodiments, system 100 may include a maximization module 150, adapted to calculate a 2D maximum matrix MAX_2D, denoted in FIG. 3 as element 151A. Matrix MAX_2D 151A may be a rectangular 2D matrix, where each line may include N entries (e.g., equal to the length of IN vector 31), equal to a maximal value in a corresponding column of product matrix PROD_2D 141A. It may be appreciated that an alternative implementation may also be possible: Matrix MAX_2D 151A may be a rectangular 2D matrix, where each column may include N entries (e.g., equal to the length of IN vector 31), equal to a maximal value in a corresponding line of product matrix PROD_2D 141A.

According to some embodiments, system 100 may include a ratio module 160, adapted to perform an elementwise operation between product matrix PROD_2D 141A and matrix MAX_2D 151A, to produce a 2D ratio matrix RATIO_2D, denoted in FIG. 3 as element 161A.

According to some embodiments, ratio matrix RATIO_2D 161A may be a rectangular 2D matrix, where each element (i, j) is an outcome of an elementwise ratio operation between product matrix PROD_2D and matrix MAX_2D. The elementwise ratio operation may be selected from a list of elementwise operations, adapted to apply a penalty for selection of a specific location data element 32 from the plurality N of location data elements 32 of IN vector 31. In other words, the elementwise ratio operation may be configured to weigh, or penalize selection of one or more specific location data element 32, as a representative of a location of an object 20', depicted in image 20.

For example, the elementwise operation may be an elementwise division operation, such that: RATIO_2D(i, j)=(PROD_2D/MAX_2D) for each pair of indices (i, j).

In another example, the elementwise operation may be a first modified elementwise division operation, such that: RATIO_2D(i, j)=(1−PROD_2D(i, j))/(1−MAX_2D(i, j)), for each pair of indices (i,j).

In yet another example, the elementwise operation may be a second modified elementwise division operation, such that: RATIO_2D(i, j)=(exp(−θ*PROD_2D$^2$)/exp(−θ*MAX_2D$^2$)), wherein θ is a constant. It may be appreciated that additional elementwise operations between PROD_2D and MAX_2D may be used to produce ratio matrix RATIO_2D.

In order to provide intuition into the process described herein, and taking the first modified elementwise division operation as an example, it may be noted that:
(a) if (1−PROD_2D(i, j)) is large (e.g., when a bounding box 32A corresponding to a higher confidence level 33 overlaps a current bounding box 32A), then a penalty for selecting the current location data element 32 may be high.
(b) if (1−MAX_2D(i, j)) is large (e.g., when the most overlapping bounding box 32A is not included in the corresponding line of MAX_2D), then the penalty for selecting the current location data element 32 may be low.

According to some embodiments, system 100 may include a penalty module, adapted to calculating a minimal value of each column of matrix RATIO_2D 161A, to produce a penalty vector PEN, denoted in FIG. 3 as element 171A. Penalty vector PEN may be a vector of N elements (e.g., the length of input vector IN 31), that may include N weights or penalty values (e.g., numerical values in the range between 0 and 1), where each weight or penalty value corresponds to a specific location data element 32 of input vector IN 31.

As elaborated herein, system 100 may calculate penalty vector PEN 171A based on REL_2D matrix 121A and MASK_2D matrix 131A, where each entry PEN(i) of penalty vector PEN 171A corresponds to a specific location data element (i, element 32) of input vector IN 31. Recapping on stages elaborated above: (a) Multiplication module 140 may calculate PROD_2D 141A as an elementwise multiplication of REL_2D matrix 121A and MASK_2D matrix 131A; (b) Maximization module 150 may calculate MAX_2D 151A according to maximal entries of PROD_2D 141A; (c) Ratio module 160 may calculate RATIO_2D matrix 161A from PROD_2D 141A and MAX_2D 151A, using an elementwise operator; and penalty module 170 may calculate penalty vector PEN based on a minimal value of each column of matrix RATIO_2D 161A.

According to some embodiments, system 100 may include a selection module 180, adapted to perform an elementwise multiplication of the confidence levels 33 of input vector IN 31 and penalty vector PEN 171A, to produce a selection vector SEL 181A.

According to some embodiments, selection module 180 may select one or more elements of selection vector SEL 181A, based on their numeric value. For example, selection module 180 may select a predefined number K of top-valued elements of selection vector SEL 181A. Additionally, or alternatively, selection module 180 may apply a predetermined threshold to selection vector SEL 181A, to select the top-valued elements of selection vector SEL 181A. It may be appreciated that the selected one or more top-valued elements of selection vector SEL 181A may correspond to one or more location data elements 32, representing the location of the one or more depicted objects 20' in image 20.

In other words, the maximal valued elements of selection vector SEL 181A may be emitted by system 100 as a filtered prediction 40, in a sense that it may include a single, optimal prediction of a location for one or more objects 20' in image 20, among the plurality of N location data elements 32 of input vector IN 31.

According to some embodiments of the invention, processing module or unit may include a plurality of processors 2, adapted to perform parallel computing and/or execution of methods elaborated herein. Thus, embodiments of the invention may be adapted to perform detection or segmentation of a plurality of objects 20', depicted in a single image 20 in parallel. Additionally, or alternatively, embodiments of the invention may be adapted to perform simultaneous, or concurrent detection or segmentation of a plurality of objects 20', depicted in a plurality of images 20 in parallel. The terms "simultaneous", "parallel" and "concurrent" may be used in this context interchangeably in a sense that the computation of these data elements may be performed substantially at the same time, by leveraging the parallel computing capabilities of a processing module 110, such as a GPU. According to some embodiments, such simultaneous or parallel computing may include construction of multidimensional data structures or tensors, and performance of computations on these multidimensional data structures, as elaborated herein.

For example, embodiments of the invention may parallelize detection and/or segmentation of objects 20' depicted in a plurality of images 20 by: (a) receiving a plurality of IN vectors 31, each corresponding to a different image 20, and depicting a respective object 20'; (b) computing in parallel, from the plurality of IN vectors 31, a corresponding plurality of SEL vectors 181A, by the plurality of processors; and (c) for each SEL vector 181A, selecting at least one location data element 32 that corresponds to at least one corresponding, top valued element of SEL vector 181A, as representing the location of a corresponding at least one depicted object 20' in the corresponding image 20.

According to some embodiments, processing module or unit may parallelize the computation of the plurality of SEL vectors 181A by: (a) calculating the PEN vectors, for each vector IN 31 of the plurality of IN 31 vectors, in parallel (e.g., by utilizing the plurality of processors 2); and (b) elementwise multiplying in parallel, by the plurality of processors 2, the confidence values 33 of each IN vector 31 with a corresponding PEN vector, to produce the plurality of product vectors SEL 181A, where each vector SEL 181A corresponds to a specific image 20.

According to some embodiments, processing module 110 may utilize the plurality of processors 2 to perform simultaneous, parallel computing of one or more data elements (e.g., 121A, 131A, 141A, 151A, 161A, 171A, 181A).

For example, embodiments of the invention may stack or aggregate a plurality of matrix or vector data elements (e.g., 121A, 131A, 141A, 151A, 161A, 171A, 181A) to produce multi-layered or multidimensional data structures, such as tensors, and then leverage the parallel computing capabilities and/or parallel or vectorial instruction sets of a modern processing module 110 such as a GPU, to simultaneously apply methods of the present invention on the multilayered data structures.

In one example, processing module 110 may compute the plurality of vectors SEL 181A in parallel by: (a) computing a plurality of REL_2D 121A matrices, each corresponding to a different IN vector 31; (b) stacking the plurality of REL_2D 121A matrices in a first multidimensional e.g., 3-dimensional (3D) tensor REL_3D 121B; (c) computing a plurality of MASK_2D matrices 131A, each corresponding to a different IN 31 vector; and (d) stacking the plurality of MASK_2D matrices 131A in a second multidimensional e.g., 3D tensor, MASK_3D 131B. Processing module 110 may then (e) compute a plurality of PEN 171A vectors in parallel, by the plurality of processors 2, based on the REL_3D 121B tensor and MASK_3D tensor 131B, where each PEN vector 171A corresponds to a specific image 20; and (f) elementwise multiply the confidence values 33 of each IN vector 31 with a corresponding PEN vector 171A, to produce a plurality of selection vector SEL 181A, wherein each vector SEL corresponds to a specific image 20.

In another example, processing module 110 may compute the plurality of PEN vectors 171A simultaneously, or in parallel according to the following steps:

Processing module 110 may collaborate with multiplication module 140, to elementwise multiply, in parallel, the REL_3D 121B tensor and MASK_3D 131B tensor, to produce a product tensor PROD_3D 141B.

Processing module 110 may then collaborate with maximum module 150, to calculate a plurality of maximum matrices MAX_2D 151A or a maximum 3D tensor MAX_3D 151B. Each line of each matrix MAX_2D 151A (or the corresponding line of tensor MAX_3D 151B) may include N entries (e.g., the size of vector IN 31). The value of the N entries may be equal to the maximal value in a corresponding column of a 2D layer of tensor PROD_3D 141B.

Processing module 110 may subsequently perform a parallel, simultaneous elementwise operation (e.g., an elementwise division operation) between product tensor PROD_3D 141B and the plurality of maximum matrices MAX_2D 151A (or tensor MAX_3D 151B), to produce a 3D ratio tensor RATIO_3D 161B.

Processing module 110 may then calculate, in parallel, a minimal value of each column of 3D ratio tensor RATIO_2D, to produce the plurality of PEN vectors.

Figure 4:
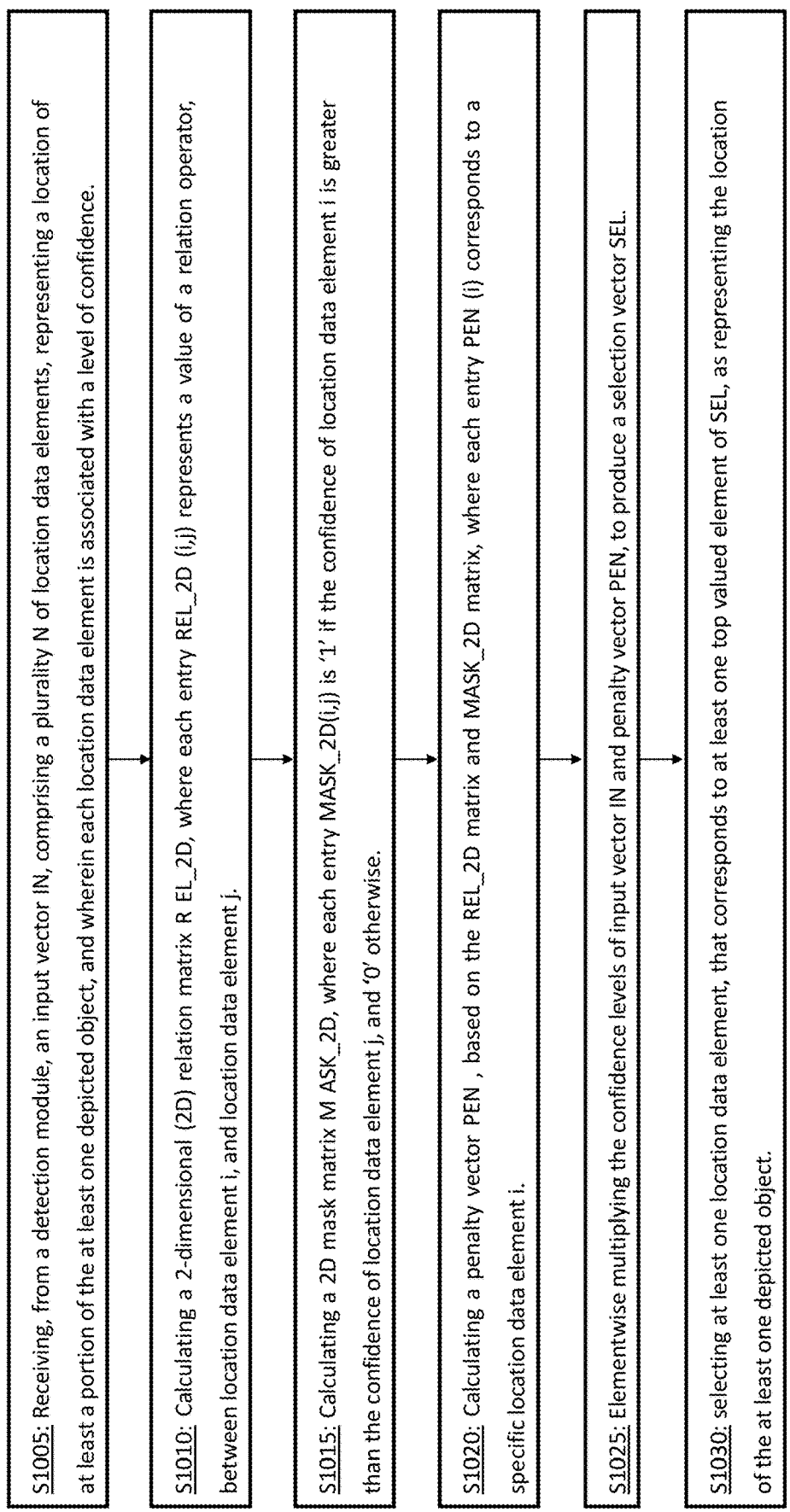
FIG. 4 is a flow diagram, showing a method for detecting at least one object depicted in an image, according to some embodiments.

Reference is now made to FIG. 4, which is a flow diagram, showing a method of detecting, by a processing unit, at least one object 20' depicted in an image 20, according to some embodiments of the invention.

As shown in step S1005, a processing unit (e.g., a processor, controller, CPU, GPU and the like, such as processing module 110 of FIG. 3) may receive, from a detection module (e.g., element 30 of FIG. 3), an input vector IN 31 (e.g., element 31 of FIG. 3). Input vector IN 31 may include a plurality N of location data elements (e.g., element 32 of FIG. 3), representing a location of at least a portion of the at least one depicted object (e.g., element 20' of FIG. 3). Location data elements 32 may be, or may include for example a bounding box, a segmented portion of a depicted object, and the like. The location data elements may be associated with a level of confidence or saliency (element 33 of FIG. 3), at which the detection module 30 evaluates them as representing or defining the location of the at least one depicted object 20' in image 20.

As shown in step S1010, processing module 110 may collaborate with a relation module (e.g., relation module 120 of FIG. 3), to calculate a 2D relation matrix, REL_2D (e.g., element 121A of FIG. 3). Each entry REL_2D (i, j) of relation matrix REL_2D 121A may represent a value of a relation operator (e.g., IoU, CIoU, etc.), between location data element i (e.g., bounding box i), and location data element j (e.g., bounding box j).

As shown in step S1015, processing module 110 may collaborate with a mask module (e.g., mask module 130 of FIG. 3), to calculate a 2D mask matrix MASK_2D (e.g., element 131A of FIG. 3). Each entry MASK_2D(i, j) of mask matrix MASK_2D 131A may be '1' if the confidence value 33 of location data element i is greater than the confidence value 33 of location data element j, and '0' otherwise.

As shown in step S1020, processing module 110 may calculate a penalty vector PEN (e.g., element 171A of FIG. 3), based on the REL_2D 121A matrix and MASK_2D matrix, as elaborated herein. Each entry PEN(i) of vector PEN 171A may correspond to a specific location data element i 32 of input vector IN 31.

As shown in step S1025, processing module 110 may perform an elementwise multiplication of the confidence levels 33 of input vector IN 31 and penalty vector PEN 171A, to produce a selection vector SEL 181A.

As shown in step S1030, processing module 110 may then detect at least one depicted object 20' that is depicted in image 20. For example, processing module 110 may detect object 20' by selecting at least one location data element 32 (e.g., segments 32B and/or bounding boxes 32A), that corresponds to at least one top-valued element of SEL 181A, as representing the location of the at least one depicted object 20' in image 20.

Embodiments of the invention include a practical application for performing identification and/or detection of one or more objects, depicted in one or more images.

As elaborated herein, embodiments of the invention may include several improvements over currently available systems and methods of ML-based, image processing algorithms, such as the NMS algorithm. Embodiments of the invention may thus facilitate an improvement in computer technology, allowing computing devices to perform identification and/or detection of objects in images more efficiently in relation to currently available image processing systems.

For example, embodiments of the invention may include an adaptation of the matrix NMS algorithm, using a mask matrix (e.g., MASK_2D 131A) or mask tensor (e.g., MASK_3D 131B) as elaborated herein, to bypass a need to perform sorting of an input vector (IN 31) according to confidence levels 33. This bypass may decrease NMS computation latency in relation to each, individual input image 20, as elaborated herein.

In another example, embodiments of the invention may include an adaptation of the matrix NMS algorithm, including construction of multidimensional (e.g., 3D) tensors, that may enable parallel, or concurrent NMS computations, as elaborated herein. Such improvement may, for example, be utilized to increase throughput of processing (e.g., segmentation and/or object detection) of a plurality of images.

In addition, and as may be appreciated by a person skilled in the art, the variety of applications of computerized object detection capabilities as provided by embodiments of the present invention are vast.

For example, as shown in FIG. 3, embodiments of the invention may be integrated into, or communicatively connected to (e.g., by wired or wireless computer connection) at least one computing device 50. Computing device 50 may be, or may include a controller or processor, such as processor 2 of FIG. 1. Computing device 50 may be adapted to receive filtered prediction(s) 40, such as location data element(s) 32, representing a location of a depicted object. Computing device 50 may act upon the received data according to a predetermined application. For example, computing device 50 may include a controller of a motor or actuator, such as a motor of a robot, and may be adapted to change a position or a location of a mechanical portion of the robot, based on the identified location of the depicted object. It may be appreciated that the improved efficiency of object detection, as provided by embodiments of the invention may provide an improvement (e.g., reduced latency) of additional computing devices 50 that may utilize prediction(s) 40, as elaborated herein.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of detecting at least one object depicted in an image by a processing unit, the method comprising:
receiving, from a detection module, an input vector IN, comprising a plurality N of location data elements provided by a machine learning model, representing a location of at least a portion of the at least one depicted object, and wherein each location data element is associated with a level of confidence;
calculating a 2-dimensional (2D) relation matrix REL_2D, where each entry REL_2D (i, j) represents a value of a relation operator, between location data element i, and location data element j;
calculating a 2D mask matrix MASK_2D, where each entry MASK 2D(i, j) is '1' if the confidence of location data element i is greater than the confidence of location data element j, and '0' otherwise;
calculating a penalty vector PEN, based on the REL_2D matrix and MASK 2D matrix, where each entry PEN(i) corresponds to a specific location data element i;
elementwise multiplying the confidence levels of input vector IN and penalty vector PEN, to produce a selection vector SEL; and
detecting the at least one depicted object by selecting at least one location data element, that corresponds to at least one top valued element of SEL, as representing the location of the at least one depicted object.

2. The method of claim 1, wherein calculating a penalty vector PEN comprises:
elementwise multiplying relation matrix REL_2D and mask matrix MASK_2D, to produce a 2D product matrix PROD_2D;
calculating a 2D maximum matrix MAX_2D, where each line comprises N entries, equal to a maximal value in a corresponding column of product matrix PROD_2D;
performing an elementwise operation between product matrix PROD_2D and matrix MAX_2D, to produce a ratio matrix RATIO_2D; and
calculating a minimal value of each column of matrix RATIO_2D, to produce vector PEN.

3. The method of claim 2, wherein the relation operator, between location data element i, and location data element j is selected from: Intersection over Union (IoU), Complete Intersection over Union (CIoU), Distance Intersection over Union (DIoU) and Generalized Intersection over Union GIoU.

4. The method of claim 2, wherein the elementwise operation between product matrix PROD_2D and matrix MAX_2D is selected from:
an elementwise division operation: (PROD 2D/MAX_2D);
a first modified elementwise division operation: ((1−PROD_2D)/(1−MAX_2D)); and a second modified elementwise division operation: $(\exp(-\theta*PROD\_2D^2)/\exp(-\theta*MAX\_2D^2))$, wherein $\theta$ is a constant value.

5. The method of claim 1, wherein the processing unit comprises a plurality of processors, and wherein the method further comprises:
receiving a plurality of IN vectors, each corresponding to a different image and depicting a respective object;
computing in parallel, from the plurality of IN vectors, a corresponding plurality of SEL vectors, by the plurality of processors; and
for each SEL vector, selecting at least one location data element that corresponds to at least one corresponding, top valued element of the SEL vector, as representing the location of a corresponding at least one depicted object in the corresponding image.

6. The method of claim 5, wherein computing the plurality of SEL vectors in parallel comprises:
calculating the PEN vectors, for each vector IN of the plurality of IN vectors, in parallel; and
elementwise multiplying in parallel, by the plurality of processors, the confidence levels of each IN vector with a corresponding PEN vector, to produce a plurality of product vectors SEL, wherein each vector SEL corresponds to a specific image.

7. The method of claim 5, wherein computing the plurality of vectors SEL in parallel further comprises:
computing a plurality of REL_2D matrices, each corresponding to a different IN vector, and stacking the plurality of REL_2D matrices in a 3-dimensional (3D) tensor REL_3D;
computing a plurality of MASK_2D matrices, each corresponding to a different IN vector, and stacking the plurality of MASK_2D matrices in a 3D tensor MASK_3D;
computing a plurality of PEN vectors in parallel, by the plurality of processors, based on the REL_3D tensor and MASK_3D tensor, wherein each PEN vector corresponds to a specific image; and
elementwise multiplying the confidence levels of each IN vector with a corresponding PEN vector, to produce a selection vector SEL, wherein each vector SEL corresponds to a specific image.

8. The method of claim 7, wherein computing the plurality of PEN vectors in parallel comprises:
elementwise multiplying, in parallel, the REL_3D tensor and MASK_3D tensor, to produce a product tensor PROD_3D;
calculating a plurality of maximum matrices MAX_2D, where each line of each matrix MAX_2D comprises N entries equal to the maximal value in a corresponding column of a 2D layer of tensor PROD_3D;
performing a parallel elementwise operation between product tensor PROD_3D and the plurality of maximum matrices MAX_2D, to produce a 3D ratio tensor RATIO_3D; and
calculating, in parallel, a minimal value of each column of 3D ratio tensor RATIO_2D, to produce the plurality of PEN vectors.

9. A system for detecting at least one object depicted in an image, the system comprising: a non-transitory memory device, wherein modules of instruction code are stored, and at least one processor associated with the memory device, and configured to execute the modules of instruction code, whereupon execution of said modules of instruction code, the at least one processor is configured to:

receive, from a detection module, an input vector IN, comprising a plurality N of location data elements provided by a machine learning model, representing a location of at least a portion of the at least one depicted object, and wherein each location data element is associated with a level of confidence;
calculate a 2D relation matrix REL_2D, where each entry REL_2D (i, j) represents a value of a relation operator, between location data element i, and location data element j;
calculate a 2D mask matrix MASK_2D, where each entry MASK 2D(i, j) is '1' if the confidence of location data element i is greater than the confidence of location data element j, and '0' otherwise;
calculate a penalty vector PEN, based on the REL_2D matrix and MASK_2D matrix, where each entry PEN (i) corresponds to a specific location data element i;
elementwise multiply input vector IN and penalty vector PEN, to produce a selection vector SEL; and
detect the at least one depicted object by selecting at least one location data element, that corresponds to at least one top valued element of SEL, as representing the location of the at least one depicted object.

10. The system of claim 9, wherein the at least one processor is configured to calculate a penalty vector PEN by:
elementwise multiplying relation matrix REL_2D and mask matrix MASK_2D, to produce a 2D product matrix PROD_2D;
calculating a 2D maximum matrix MAX_2D, where each line comprises N entries, equal to a maximal value in a corresponding column of product matrix PROD_2D;
performing an elementwise operation between product matrix PROD_2D and matrix MAX_2D, to produce a ratio matrix RATIO_2D; and
calculating a minimal value of each column of matrix RATIO_2D, to produce vector PEN.

11. The system of claim 10, wherein the relation operator between location data element i and location data element j is selected from: Intersection over Union (IoU), Complete Intersection over Union (CIoU), Distance Intersection over Union (DIoU) and Generalized Intersection over Union GIoU.

12. The system of claim 10, wherein the elementwise operation between product matrix PROD_2D and matrix MAX_2D is selected from:
an elementwise division operation: (PROD_2D/MAX_2D);
a first modified elementwise division operation: ((1−PROD_2D)/(1−MAX_2D)); and
a second modified elementwise division operation: $(\exp(-\theta*PROD\_2D^2)/\exp(-\theta*MAX\_2D^2))$, wherein $\theta$ is a constant value.

13. The system of claim 9, wherein the at least one processor comprises a plurality of processors configured to:
receive a plurality of IN vectors, each corresponding to a different image and depicting a respective object;
compute in parallel, from the plurality of IN vectors, a corresponding plurality of SEL vectors; and
for each SEL vector, select at least one location data element that corresponds to at least one corresponding, top valued element of the SEL vector, as representing the location of a corresponding at least one depicted object in the corresponding image.

14. The system of claim 13, wherein the plurality of processors are configured to compute the plurality of SEL vectors in parallel by:

calculating the PEN vectors, for each vector IN of the plurality of IN vectors, in parallel; and elementwise multiplying in parallel, by the plurality of processors, the confidence levels of each IN vector with a corresponding PEN vector, to produce a plurality of product vectors SEL, wherein each vector SEL corresponds to a specific image.

15. The system of claim 13, wherein the plurality of processors are configured to compute the plurality of vectors SEL in parallel by:

computing a plurality of REL_2D matrices, each corresponding to a different IN vector, and stacking the plurality of REL_2D matrices in a 3-dimensional (3D) tensor REL_3D;

computing a plurality of MASK_2D matrices, each corresponding to a different IN vector, and stacking the plurality of MASK_2D matrices in a 3D tensor MASK_3D;

computing a plurality of PEN vectors in parallel, by the plurality of processors, based on the REL_3D tensor and MASK_3D tensor, wherein each PEN vector corresponds to a specific image; and elementwise multiplying the confidence levels of each IN vector with a corresponding PEN vector, to produce a selection vector SEL, wherein each vector SEL corresponds to a specific image.

16. The system of claim 15, wherein the plurality of processors are configured to compute the plurality of PEN vectors in parallel by:

elementwise multiplying, in parallel, the REL_3D tensor and MASK_3D tensor, to produce a product tensor PROD_3D;

calculating a plurality of maximum matrices MAX_2D, where each line of each matrix MAX_2D comprises N entries equal to the maximal value in a corresponding column of a 2D layer of tensor PROD_3D;

performing a parallel elementwise operation between product tensor PROD_3D and the plurality of maximum matrices MAX_2D, to produce a 3D ratio tensor RATIO_3D; and calculating, in parallel, a minimal value of each column of 3D ratio tensor RATIO_2D, to produce the plurality of PEN vectors.

* * * * *